United States Patent [19]

Kuwano et al.

[11] Patent Number: 5,739,844
[45] Date of Patent: Apr. 14, 1998

[54] METHOD OF CONVERTING TWO-DIMENSIONAL IMAGE INTO THREE-DIMENSIONAL IMAGE

[75] Inventors: Yukinori Kuwano; Takahisa Andou; Tetsuya Enomoto, all of Osaka-fu; Nobuaki Uwa, Hyogo-ken, all of Japan

[73] Assignee: Sanyo Electric Co. Ltd., Osaka-Fu, Japan

[21] Appl. No.: 383,207

[22] Filed: Feb. 3, 1995

[30] Foreign Application Priority Data

| | | | |
|---|---|---|---|
| Feb. 4, 1994 | [JP] | Japan | 6-012857 |
| Feb. 25, 1994 | [JP] | Japan | 6-028435 |
| Mar. 14, 1994 | [JP] | Japan | 6-042463 |

[51] Int. Cl.[6] .................................... H04N 7/18
[52] U.S. Cl. .................................... 348/43; 348/51
[58] Field of Search .................. 348/42-54; 345/1, 345/6; 395/119, 128; H04N 7/18

[56] References Cited

U.S. PATENT DOCUMENTS

| | | | |
|---|---|---|---|
| 5,028,994 | 7/1991 | Miyakawa et al. | 348/42 |
| 5,432,543 | 7/1995 | Hasegawa et al. | 348/45 |
| 5,510,832 | 4/1996 | Garcia | 348/42 |

*Primary Examiner*—Howard W. Britton
*Assistant Examiner*—Richard Lee
*Attorney, Agent, or Firm*—Nikaido Marmelstein Murray & Oram LLP

[57] ABSTRACT

A two-dimensional image which is constitute by a plurality of frame images which are continuous in time is taken as an image for one eye, while a two-dimensional image obtained by shifting the frame image by N frames (N includes zero and is not fixed), thereby to produce a three-dimensional image. For example, the two-dimensional image is not changed, that is, the frame difference (N) is adjusted to "0" with respect to a portion of the two-dimensional image whose content is not easily converted into a three-dimensional image, while the frame difference (N) is adjusted to (N) larger than (N) for a normal three-dimensional image with respect to a portion of the two-dimensional image whose content is very easily converted into a three-dimensional image, thereby to give further three-dimensional feeling to a viewer as well as reduce the fatigue of the eyes of the viewer.

8 Claims, 15 Drawing Sheets

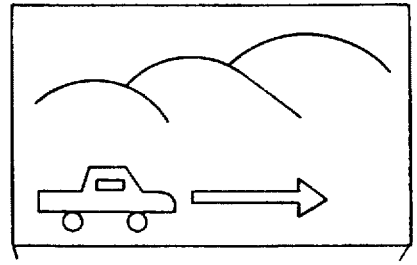
Fig.2(a)
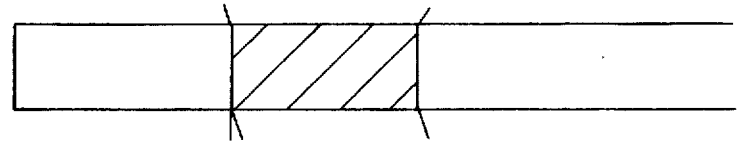
Fig.2(b)
ORIGINAL 2D IMAGE
(LEFT EYE)
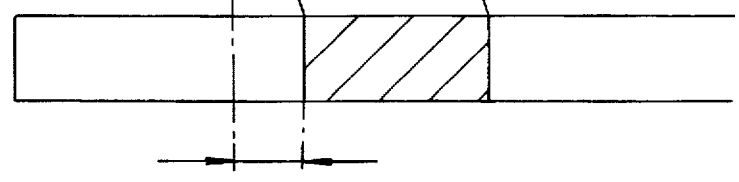
Fig.2(c)
2D IMAGE SUBJECTED
TO FRAME DELAY
(RIGHT EYE)
N FRAMES
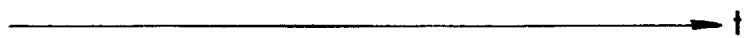

ORIGINAL 2D IMAGE
(LEFT EYE)

2D IMAGE SUBJECTED
TO FRAME PROGRESS
(RIGHT EYE)

N FRAMES t

ORIGINAL 2D IMAGE
(LEFT EYE)

2D IMAGE SUBJECTED
TO FRAME DELAY
(RIGHT EYE)

N FRAMES t

METHOD OF CONVERTING TWO-DIMENSIONAL IMAGE INTO THREE-DIMENSIONAL IMAGE

BACKGROUND OF THE INVENTION

1. Field of the Invention

The present invention relates to a method of converting into a three-dimensional (3D) image a two-dimensional (2D) image which is output from a video tape recorder, a video camera or the like, produced by a computer, or transmitted by CATV (Cable Television) or TV broadcasting.

2. Description of the Prior Art

Almost all types of 3D image software used for a 3D display system which has been recently in the news is particularly produced for the 3D display system. The 3D image software is generally obtained by picking up a right eye image and a left eye image using two cameras.

The two left and right images picked up and recorded are alternately and simultaneously displayed in a vertical stripe shape on one display, for example, and the right eye image and the left eye image are respectively separately incident on the left eye and the right eye of a viewer using a parallax barrier or the like. Consequently, the viewer recognizes the images on the display as a 3D image.

However, many types of 2D image software exist in the world. If these types of 2D image software can be converted into 3D images, therefore, time and cost required to newly produce image software dedicated to 3D images can be reduced. Therefore, a method of converting a 2D image into a 3D image has been developed.

This method is a method of taking a 2D image which is constituted by a plurality of frame images which are continuous in time as an image for one eye, while taking a 2D image obtained by shifting in time the image for one eye by a predetermined number of frames as an image for the other eye. That is, the frame images are shifted in time, thereby to cause parallax between the image for one eye and the image for the other eye. If the two left and right images between which there is parallax are displayed, a 3D image having approximately the same degree as that in the above described case where the left and right images picked up by the two cameras are displayed is obtained.

However, some 2D images are easily converted into 3D images and the other 2D images are not easily converted into 3D images depending on the contents thereof. Accordingly, 3D feeling cannot be uniformly extracted only by uniform frame delay. Further, when a portion of the 2D image whose content is not easily converted into a 3D image is also converted into a 3D image, a viewer continuously views the 3D image over a long time period, thereby to increase the fatigue of the eyes of the viewer.

SUMMARY OF THE INVENTION

Therefore, an object of the present invention is to take a 2D image which is constituted by a plurality of frame images which are continuous in time as an image for one eye and take a 2D image obtained by shifting the image for one eye by N frames (N includes zero and is not fixed) as an image for the other eye, thereby to produce a 3D image.

Consequently, the 2D image is not changed, that is, the frame difference (N) between the frame images is adjusted to "0" with respect to a portion of the 2D image whose content is not easily converted into a 3D image, while the frame difference (N) is adjusted to a frame difference (N) larger than a frame difference (N) for a normal 3D image with respect to a portion of the 2D image whose content is easily converted into a 3D image, thereby to give further 3D feeling to a viewer as well as reduce the fatigue of the eyes of the viewer.

In the above described invention, the 2D image is rapidly changed into the 3D image, and conversely the 3D image is rapidly changed into the 2D image, whereby the viewer recognizes the displayed image as an unusual 3D image or 2D image just after a change point of the images.

One of reasons for this is conceivably that the eyes of the viewer cannot be rapidly accustomed to the changed image because they are accustomed to the image before the change point.

Furthermore, the same problem occurs even at a change point of scenes. Specifically, if a scene currently projected on the original 2D image is changed into an entirely different scene, the viewer views the scene before the change by frame delay with the one eye, while simultaneously viewing the scene after the change with the other eye, whereby the viewer views an unusual image at the change point.

Therefore, the present invention solves a problem occurring at the change point of the 2D image and the 3D image or the change point of the scenes.

Specifically, in the present invention, the above described frame difference N is gradually changed at the change point of the 2D image and the 3D image.

Consequently, the 2D image is prevented from being rapidly changed into the 3D image, and conversely the 3D image is prevented from being rapidly changed into the 2D image.

Furthermore, the above described frame difference N is so gradually changed that the image for one eye and the image for the other eye have frame images on which a common scene is projected at the change point of the scenes on the original 2D image.

Therefore, images on which different scenes are respectively projected are prevented from entering the right eye and the left eye of the viewer to be an unusual image.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a conceptual diagram showing extraction of the preceding frame in a case where there is an object moving rightward in the first embodiment of the present invention;

DESCRIPTION OF THE PREFERRED EMBODIMENTS (Embodiment 1)

A method of converting a 2D image into a 3D image in the present invention will be described in detail on the basis of a flow chart of FIG. 1 and conceptual diagrams of FIGS. 2 to 4.

Figure 1:
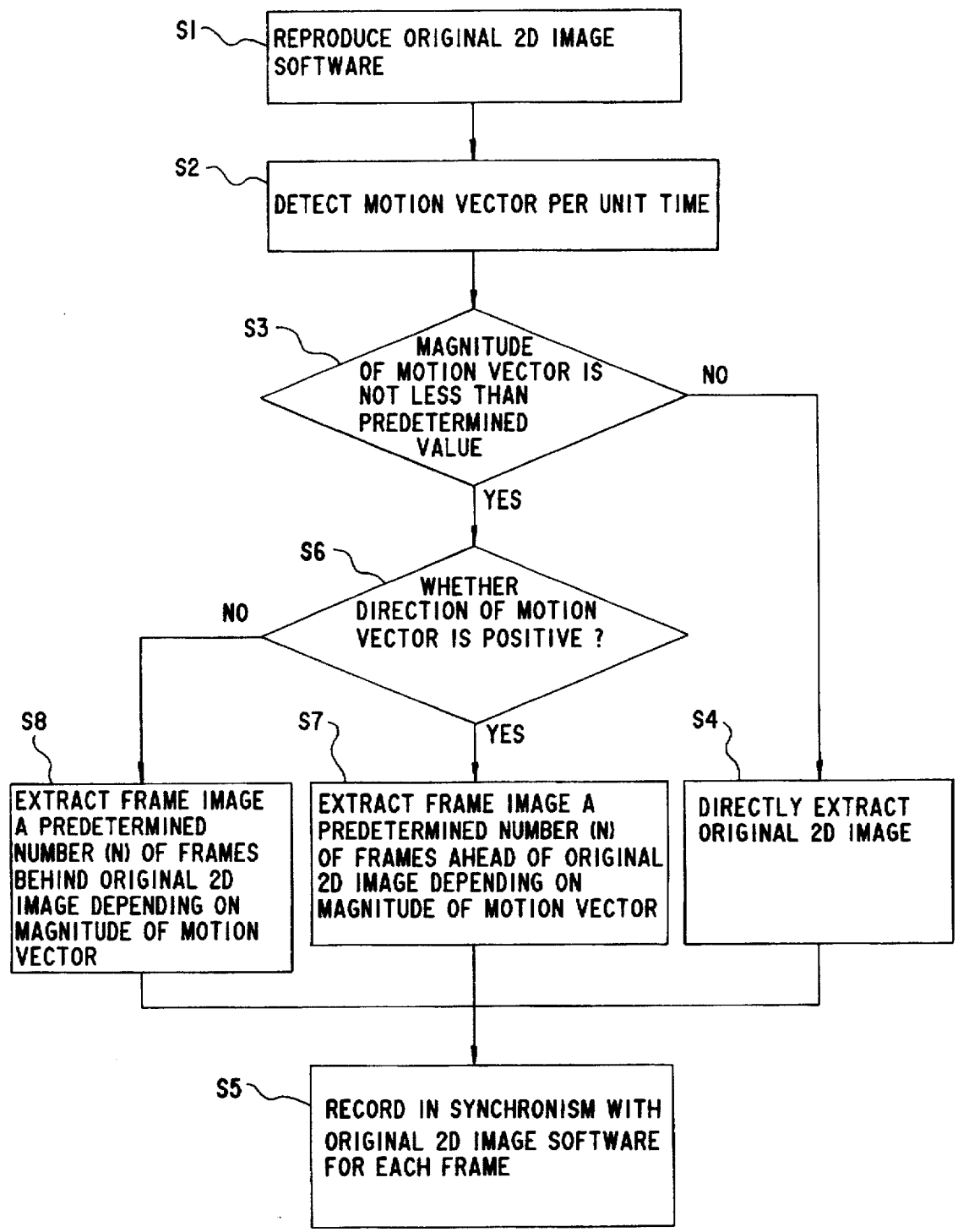
FIG. 1 is a flow chart showing the contents of image processing in a first embodiment of the present invention.

As shown in FIG. 1, existing 2D image software (to be a left eye image when it is converted into a 3D image) is first reproduced using a video tape recorder (hereinafter referred to as a VTR) or the like in the step S1.

With respect to an image obtained by the reproduction, a motion vector of a moving object in the image is detected for each frame in the step S2. The motion vector is detected with respect to the magnitude (the absolute value) and the direction (the direction of the rightward movement shall be positive, while the direction of the leftward movement shall be negative). A specific method of detecting the motion vector will be described later.

A predetermined value (a threshold value) is set, thereby to produce a 2D image by frame progress and frame delay with respect to a scene in which the magnitude of the motion vector is more than the predetermined value. Therefore, the magnitude of the motion vector between adjacent frames is compared with the predetermined value in the step S3.

When the magnitude of the motion vector is less than the above describe predetermined value, the program proceeds to the step S4, to directly extract the original 2D image and record the original 2D image in synchronism with the original 2D image software for each frame (step S5). The reason for this is that even if a 2D image is produced by frame delay or frame progress, the degree to which the 2D image is converted into a 3D image is low in a case where the magnitude of the motion vector is small.

The recording in the step S5 may be recording on a record medium such as a magnetic tape or may be recording on a record medium such as an image memory.

When the magnetic tape is used, both a right eye image and a left eye image are recorded on one or two magnetic tapes, and both the images are simultaneously reproduced and displayed on one display, thereby to make it possible to enjoy 3D image software. In other words, 3D image software is produced from 2D image software commercially available and is recorded on a magnetic tape. A viewer sets the magnetic tape newly produced on a 3D tape reproducing player, to enjoy the 3D image software.

On the other hand, if the image memory is used, a right eye image and a left eye image are displayed on a display at the same time that 2D image software is reproduced, thereby to make it possible to enjoy 3D image software. In other words, it is possible to enjoy 3D image software immediately only by directly reproducing 2D image software commercially available.

Additionally, when the magnitude of the motion vector is not less than the predetermined value in the foregoing step S3, it is determined in step S6 whether the direction of the motion vector is positive or negative.

When the direction of the motion vector is positive, the moving object is moving rightward, whereby a frame image which is a predetermined number (N) of frames ahead of the original 2D image is extracted depending on the magnitude of the motion vector (step S7), and the frame image which is a predetermined number of frames ahead of the original 2D image is recorded in synchronism with the original 2D image in the step S5.

On the other hand, when the direction of the motion vector is negative in the foregoing step S6, the moving object is moving leftward, whereby a frame image which is a predetermined number (N) of frames behind the original 2D image is extracted depending on the magnitude of the motion vector (step S8), and the frame image which is a predetermined number (N) of frames behind the original 2D image is recorded in synchronism with the original 2D image in the step S5.

In the foregoing step S5, the above described predetermined number (N) is small when the absolute value of the motion vector is large (that is, the moving speed thereof is high), while being large when the absolute value of the motion vector is small (that is, the moving speed thereof is low).

Furthermore, a 3D effect of the moving object, that is, the degree to which the moving object is viewed as if it was jumped out of a display screen is adjusted by suitably changing the predetermined number (N), thereby to make it possible to emphasize the object to be jumped out.

FIG. 2(a) illustrates a scene in which a moving object (an automobile) is moving rightward at a relatively high speed. FIG. 2(b) illustrates the original 2D image (for a left eye), and FIG. 2(c) illustrates a 2D image (for a right eye) which is subjected to frame delay. As apparent from FIGS. 2(a), 2(b) and 2(c), an image which is N frames (several frames) ahead of the original 2D image becomes a right eye image. At this time, the right eye image is produced in synchronism with the left eye image.

Figure 3A:
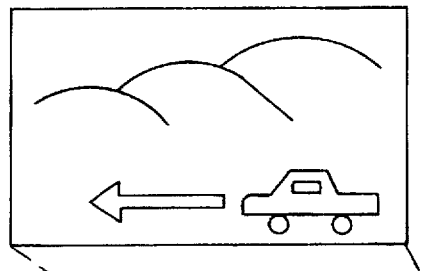
FIG. 3 is a conceptual diagram showing extraction of the preceding frame in a case where there is an object moving leftward in the first embodiment of the present invention.
Figure 3B:
Figure 3C:
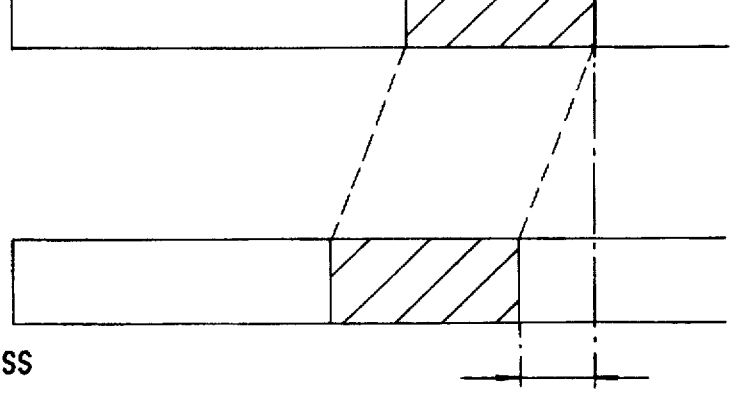

FIG. 3(a) illustrates a case where a moving object is moving leftward at a relatively high speed, which is the reverse of FIG. 2. FIG. 3(b) illustrates the original 2D image (for a left eye), and FIG. 3(c) illustrates a 2D image (for a right eye) which is subjected to frame progress. As apparent from FIGS. 3(a), 3(b) and 3(c), an image which is N frames behind the original 2D image becomes a right eye image. At this time, the right eye image is produced in synchronism with the left eye image.

Figure 4A:
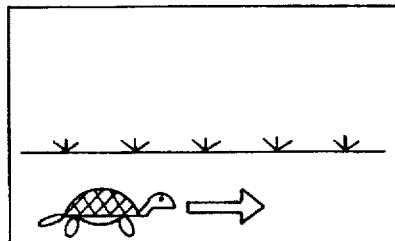
FIG. 4 is a conceptual diagram showing extraction of the preceding frame in a case where there is an object slowly moving rightward in the first embodiment of the present invention.
Figure 4B:
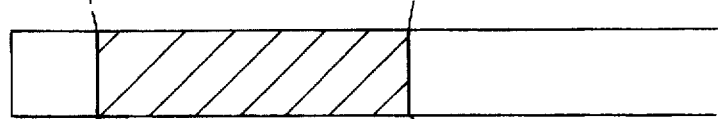
Figure 4C:
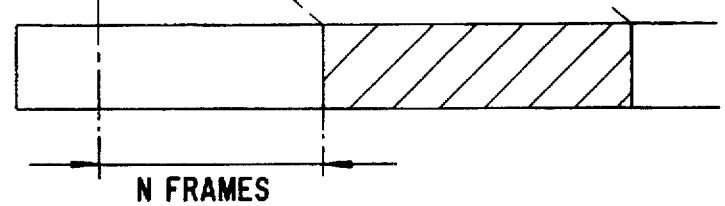

FIG. 4(a) illustrates a case where the speed of a moving object (a tortoise in this case) is relatively lower, as compared with those in FIGS. 2 and 3. FIG. 4(b) illustrates the original 2D image (for a left eye), and FIG. 4(c) illustrates a 2D image (for a right eye) which is subjected to frame delay. As apparent from FIGS. 4(a), 4(b) and 4(c), an image which is N frames (several tens of frames), for example, 5 ahead of the original 2D image becomes a right eye image. At this time, the right eye image is produced in synchronism with the left eye image.

In the conceptual diagrams of FIGS. 2 to 4, description is made of an example in which an image can be viewed as if a moving object was short of a display screen (on the side of a viewer). In the examples, however, when the moving object is in an approximately central position of the screen and the background (a mountain or grass in the drawing) is moving in a direction indicated by an arrow, the direction of a motion vector is reversed, thereby to make it possible to allow the viewer to recognize such a 3D effect that only the background is positioned at the back of the screen.

Furthermore, portions hatched in the conceptual diagrams of FIGS. 2 to 4 illustrate a mass of scenes, which corresponds to not one frame but a lot of frames. In the drawing, t indicates a time base.

Although a scene to be converted into a 3D image is automatically selected by detecting the motion vector as described above, the scene may be manually selected. Specifically, a scene which the viewer desires to convert into a 3D image may be selected by depressing a converting switch from a 2D image to a 3D image which is provided on a remote control switch, for example, to enjoy a 3D image until the converting switch is depressed again.

In this case, the amount of jump of the object out of the screen may be automatically adjusted depending on the magnitude and the direction of the motion vector, or can be also freely adjusted by operating an adjusting switch provided on the remote control switch to the taste of the viewer.

Furthermore, the above described frame difference N may be adjusted for each switching of scenes on the original 2D image, or may be adjusted in two stages, that is, "no amount of shift" for maintaining a 2D image and "a predetermined amount of shift" for obtaining a 3D image.

Although in the present embodiment, the 2D image recorded on the magnetic tape is reproduced, output and converted into 3D image software, it goes without saying that the converting method according to the present invention is also applicable to a 2D image output from a video camera and a 2D image transmitted by CATV, TV broadcasting or the like.

As described in the foregoing, it is possible to switch the 2D image and the 3D image to view the image, and the amount of jump of the object out of the screen is also adjusted, thereby to make it possible to further increase the 3D effect as well as reduce the fatigue of the eyes of the viewer.

Furthermore, a portion of the 2D image which is not easily recognized as a 3D image remains the 2D image, thereby to make it possible to eliminate unnaturalness. Even if the direction of the movement of the moving object varies, it is possible to convert the 2D image into a 3D image to the same degree.

Description is now made of a specific method of detecting a motion vector. Examples of the method of detecting a motion vector include an all points matching method and a typical point matching method. Either one of the methods is a method of shifting an image in the current frame and an image in a frame which is one frame behind the current frame by the amount of the vector within the range of detection and overlapping the images to see the manner of overlapping. Particularly, the typical point matching method pays attention to some pixels (hereinafter referred to as typical points) on a screen and determines the motion vector from the amount of movement of the pixels.

Figure 5:
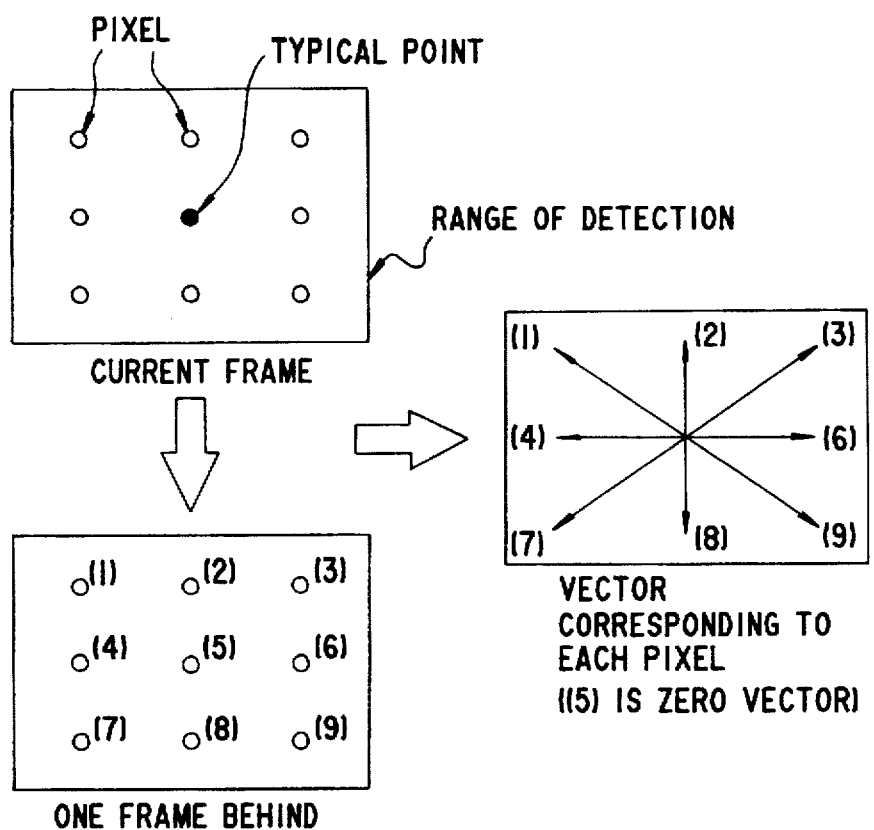
FIG. 5 is a conceptual diagram showing detection of a motion vector.

FIG. 5 is a schematic view showing the typical point matching method. In FIG. 5, the level of a typical point is written into a memory (not shown) and is compared with the levels of respective pixels (1) to (9) within the range of detection in a frame which is one frame behind the current frame. It is determined that the typical point is moved to the position of the pixel whose level is the closest to the level of the typical point, and the corresponding vector is taken as a motion vector. In practice, more typical points are provided. (Embodiment 2)

Description is now made of a second embodiment of the present invention. A method of converting a 2D image into a 3D image according to the present embodiment is a method of gradually changing a frame difference (N) in time between frame images at a change point of the 2D image and the 3D image.

The change point of the 2D image and the 3D image may be selected by the experience and the sensitivity of a viewer himself or herself to make the above described change. Alternatively, the change point of the 2D image and the 3D image may be automatically determined to make the above described change using the motion vector described in the embodiment 1.

Figure 6:
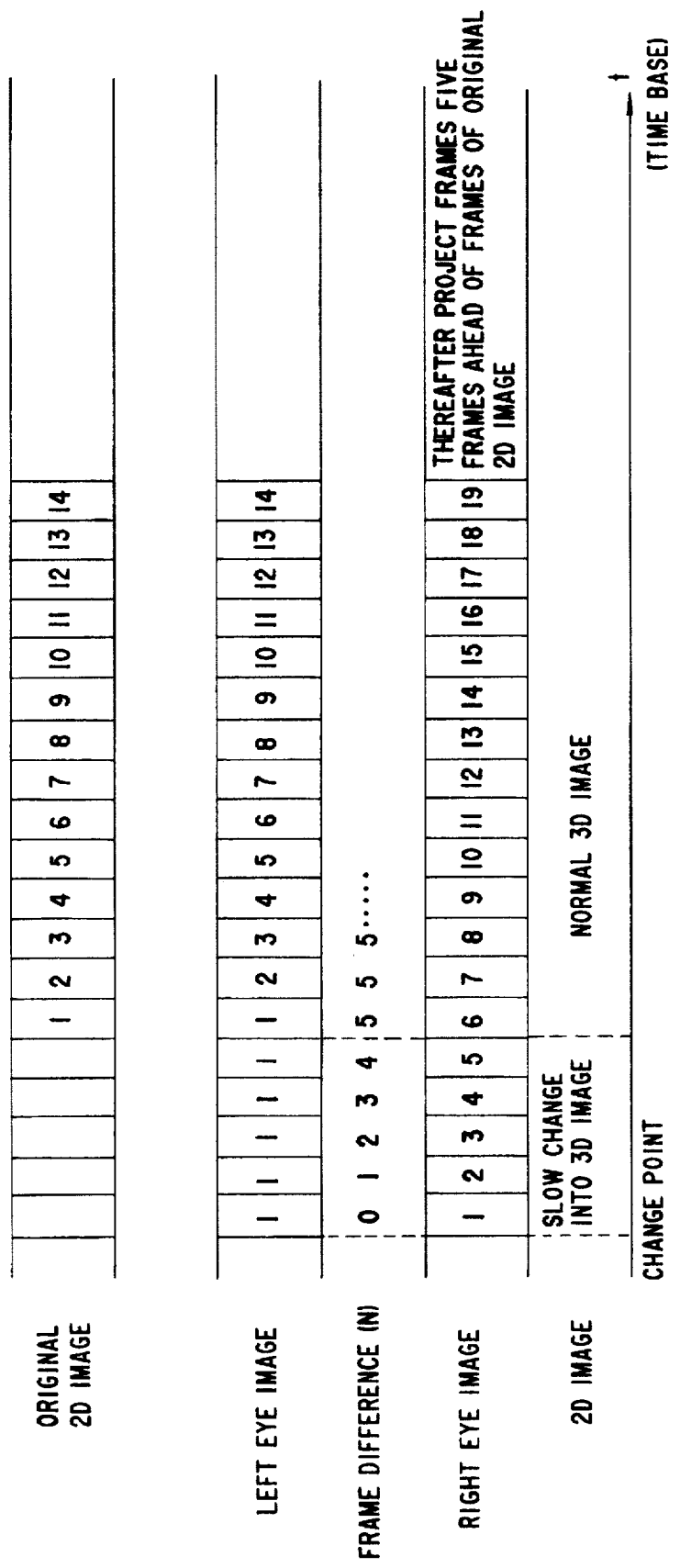
FIG. 6 is a conceptual diagram for explaining a method of converting a 2D image into a 3D image in a second embodiment of the present invention.
Figure 7:
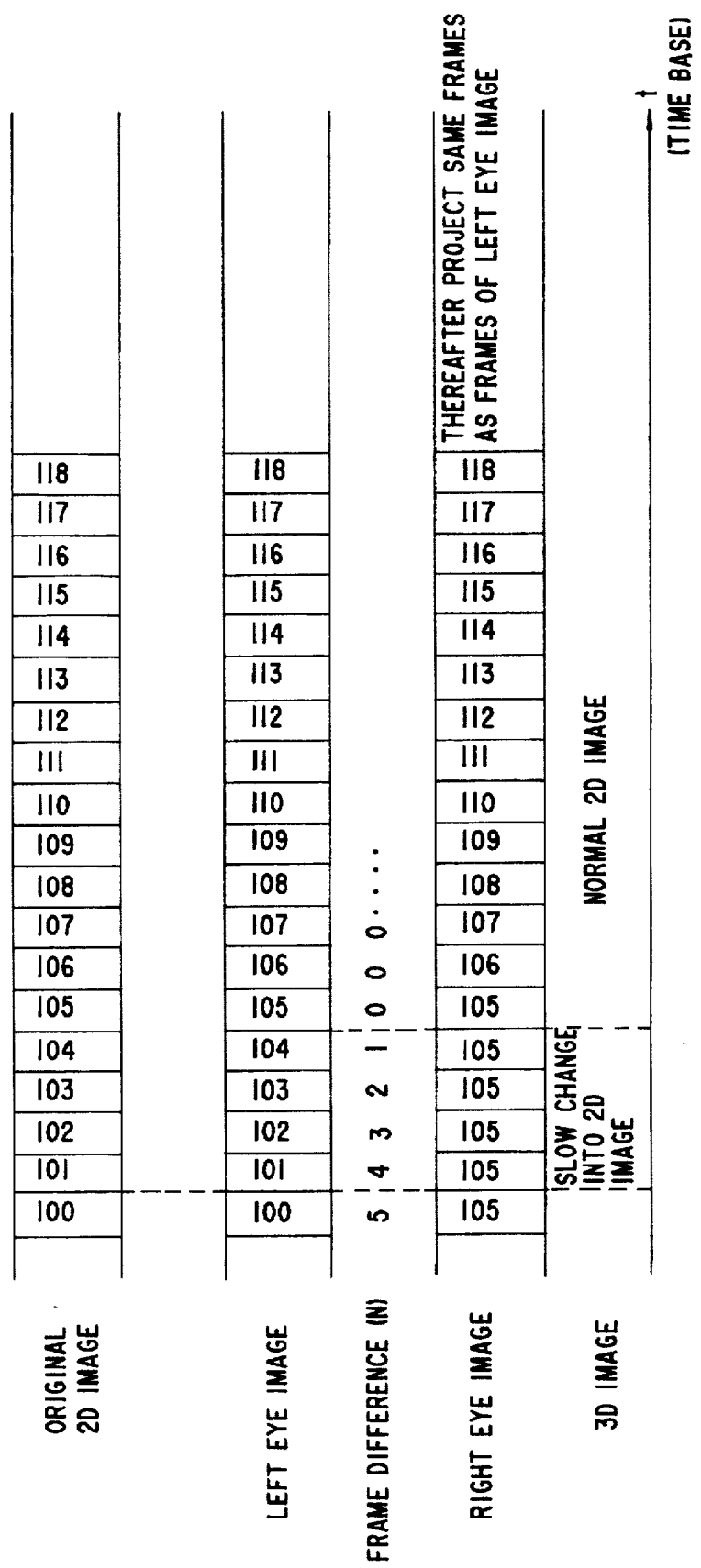
FIG. 7 is a conceptual diagram for explaining a method of converting a 3D image into a 2D image in the second embodiment of the present invention.

FIG. 6 is an illustration showing a correspondence in a case where a 2D image is changed into a 3D image in this method, and FIG. 7 is an illustration showing a correspondence in a case where a 3D image is changed into a 2D image.

A frame difference (N) between a left eye image and a right eye image in the 3D image shall be "5" In addition, frames constituting the left eye image shall be frames ahead of frames constituting the right eye image on a time base (that is, an image comprising an object to be jumped out and the background is so converted into a 3D image that the background is set back from a television screen when it is moving rightward).

Description is now made of a method of producing a 3D image from the original 2D image at a change point with reference to FIG. 6.

Frame images constituting the original 2D image, that is, a frame 1, a frame 2, ... are output in that order from the original 2D image, and the output frame images are taken as a right eye image.

On the other hand, a left eye image becomes a still image by repeatedly outputting a particular frame image for a predetermined time period.

In the example shown in FIG. 6, the particular frame image is a frame 1, and the predetermined time period is an output time period corresponding to five frames. In this case, if the left eye image and the right eye image conform in the time base with each other in the first frame 1, a frame difference (N) in time between both the images becomes 0, 1, 2, 3, 4, 5, 5, ... in that order. That is, adjustment is so made that the frame difference (N) gradually increases. Consequently, this time period is a time period of slow conversion into a 3D image during which the frame difference (N) between the left eye image and the right eye image on a screen increases.

After the required frame difference "5" is obtained, the frames constituting each of the left eye image and the right eye image are projected with they increasing one at a time while maintaining the frame difference, thereby to obtain a normal 3D image.

Description is now made of a method of producing a 2D image from the original 3D image at a change point with reference to FIG. 7.

When the original 2D image is in a state where an image of a frame 100 is output, an image of a frame 100 is also output as a left eye image. In a state where a 3D image is produced, an image of a frame 105 is output as a right eye image, so that a frame difference between the right eye image and the left eye image is "5". If an attempt to return the 3D image to a 2D image in this state is made, the image of the frame 105 is output repeatedly for a time period corresponding to five frames as frame images of the right eye image which are to be output thereafter on the basis of a change point as shown. That is, the right eye image becomes a still image for this time period.

By providing the still time period, the frame difference (N) becomes 5, 4, 3, 2, 1, 0, 0, 0 . . . in that order. That is, adjustment is so made that the frame difference (N) gradually decreases. Consequently, this time period becomes a time period of slow return to a 2D image during which the frame difference (N) gradually decreases.

After the frame difference (N) between the left eye image and the right eye image becomes "0", the same frames are projected as both the images, thereby to obtain a normal 2D image. It goes without saying that output of frame images constituting the right eye image may be cut to output only frame images constituting the left eye image at the time point where the frame difference (N) becomes "0".

Description is now made of a modified example of the present embodiment. Although in the above described example, the frame difference (N) becomes 0, 1, 2, 3, 4, 5, 5, 5, . . . or 5, 4, 3, 2, 1, 0, 0, 0 . . . in that order, a time period during which the frame difference (N) is the same corresponds to several frames, that is, the frame difference (N) becomes 0, 1, 1, 1, 1, 2, 2, 2, 2, 3, 3, 3, 3, . . . or 4, 4, 4, 4, 3, 3, 3, 3, 2, 2, 2, 2, . . . in that order in the modified example.

Figure 8:
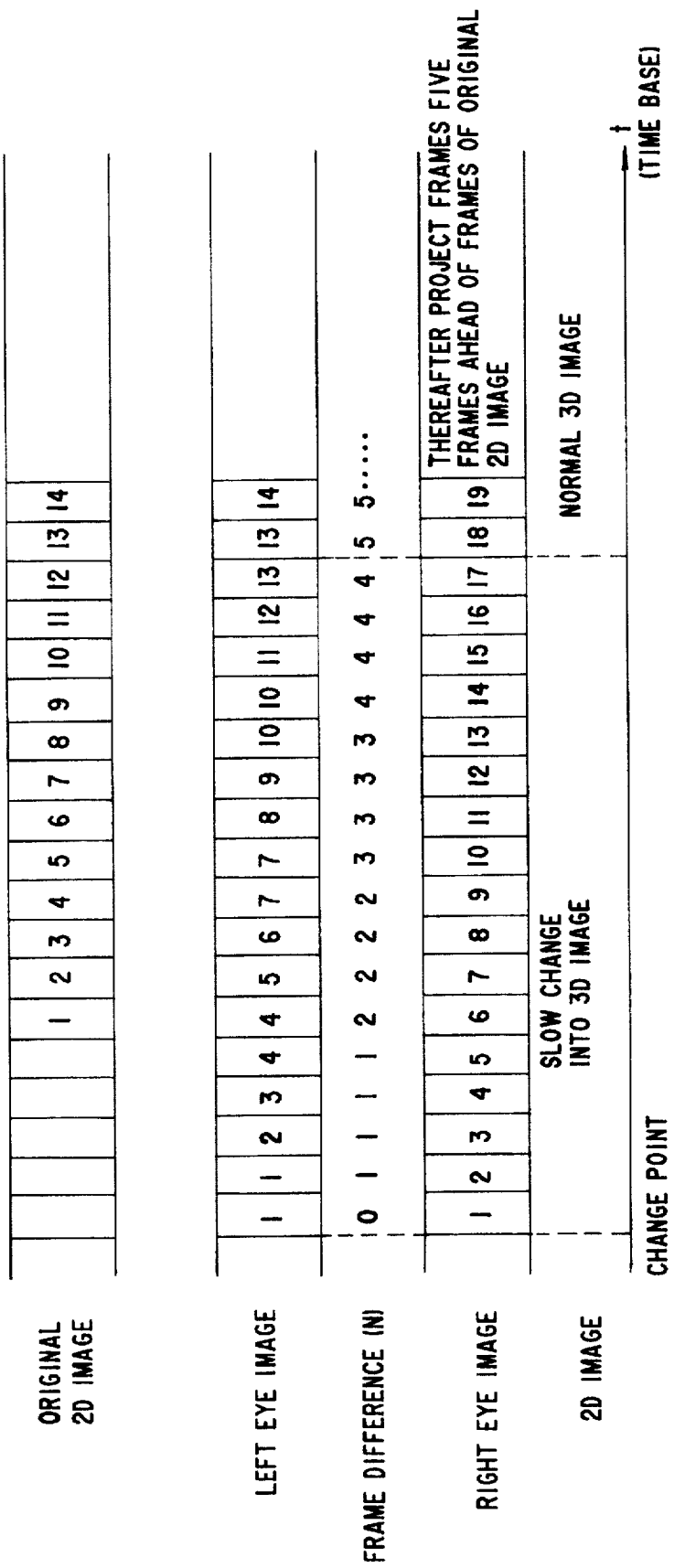
FIG. 8 is a conceptual diagram for explaining a method of converting a 2D image into a 3D image in the second embodiment of the present invention.
Figure 9:
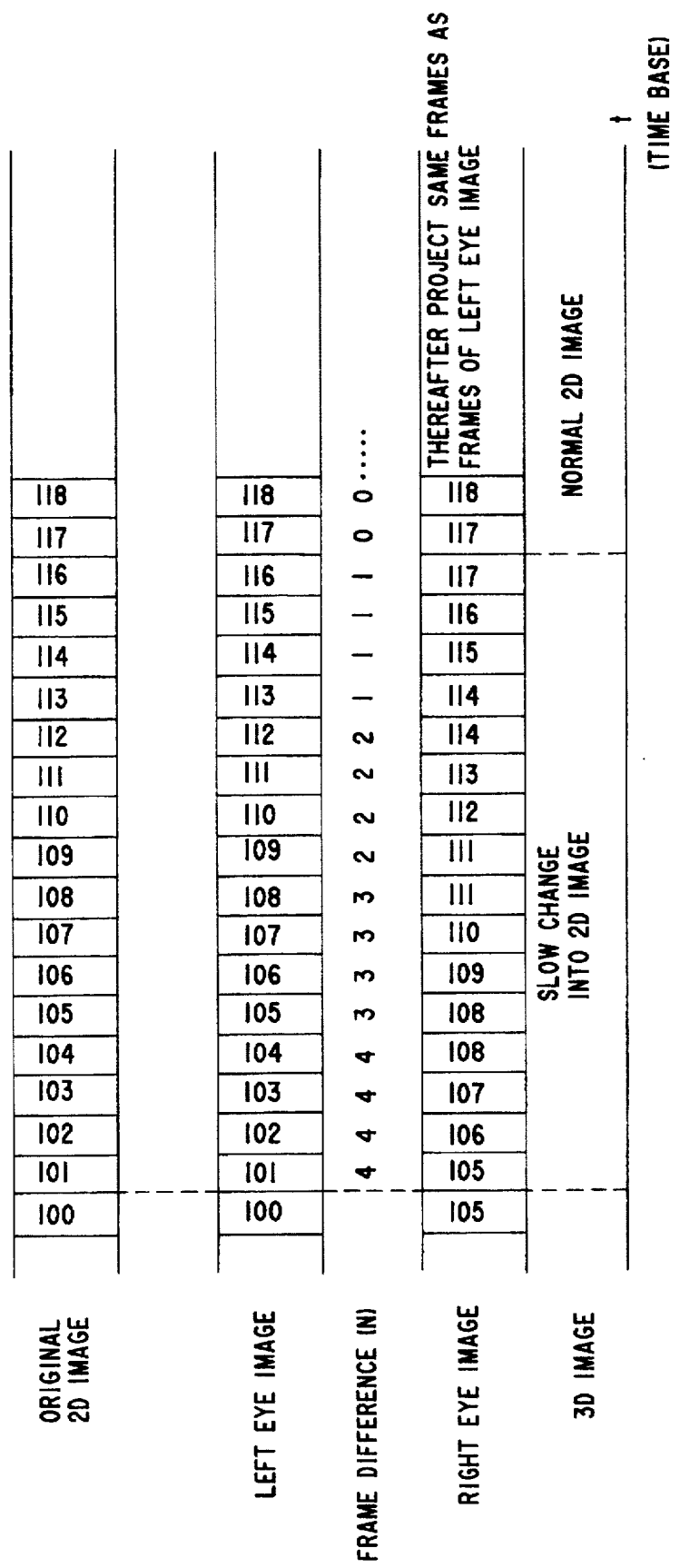
FIG. 9 is a conceptual diagram for explaining a method of converting a 3D image into a 2D image in the second embodiment of the present invention.

FIG. 8 is an illustration showing processing in a case where a 2D image is changed into a 3D image in this modified example, and FIG. 9 is an illustration showing processing in a case where a 3D image is changed into a 2D image in the modified example.

In FIG. 8, frame images constituting the original 2D image, that is, a frame 1, a frame 2, . . . are output in that order from the original 2D image, and the output frame images are taken as a right eye image.

On the other hand, a left eye image is obtained by repeatedly outputting each of two or more frame images for a predetermined time period. In the example shown in FIG. 8, the two or more frame images are frames 1, 4, 7, 10 and 13, and the predetermined time period is a time period corresponding to two frames.

Specifically, as the left eye image, frames 1, 1, 2, 3, 4, 4, 5, 6, 7, 7, 8, 9, 10, 10, 11, 12, 13, . . . are output in that order. Consequently, the above described frame difference (N) gradually changes for each time period corresponding to four frames, that is, the frame difference (N) becomes 0, 1, 1, 1, 1, 2, 2, 2, 2, 3, 3, 3, 3, . . . , and it takes a time period corresponding to 17 frames as a whole. Therefore, the speed at which the frame difference decreases becomes lower, as compared with that in the case shown in FIG. 6.

In FIG. 9, when the original 2D image is in a state where an image of a frame 100 is output, an image of a frame 100 is also output as a left eye image. In a state where a 3D image is produced, an image of a frame 105 is output as a right eye image, so that a frame difference between the right eye image and the left eye image is "5". If an attempt to return the 3D image to a 2D image in this state is made, each of frames 105, 108, 111, 114 and 117 is output repeatedly for a time period corresponding to two frames as frame images of the right eye image which are to be output thereafter on the basis of a change point as shown.

Specifically, frames 105, 105, 106, 107, 108, 108, . . . are output in that order as the right eye image. Consequently, the frame difference (N) gradually changes for each time period corresponding to four frames, that is, the frame difference (N) becomes 5, 4, 4, 4, 4, 3, 3, 3, 3, 2, 2, 2, 2, 1, 1, 1, 1, 0, 0, . . . in that order, and it takes a time period corresponding to 16 frames as a whole. Therefore, the speed at which the frame difference decreases becomes lower, as compared with that in the case as shown in FIG. 7.

Thus, the longer the time period of slow conversion into a 3D image or the time period of slow return to a 2D image is, the more easily the viewer's eyes can be accustomed to the image.

As described in the foregoing, the conversion into the 3D image or the return to the 2D image is slowly achieved at a change point from the 2D image to the 3D image or from the 3D image to the 2D image, whereby the viewer's eyes are easily adapted to both the changes, thereby to make it possible for the viewer to enjoy the 3D image without fatigue.

(Embodiment 3)

Description is now made of a third embodiment of the present invention. A method of converting a 2D image into a 3D image according to the present invention is a method of gradually adjusting the above described frame difference (N) so that an image for one eye and an image for the other eye have frame images on which a common scene is projected at a change point of scenes on the original 2D image. Examples of the change point of the scenes include a case where an indoor image is switched to an outdoor image and a case where an image of a human figure is switched to an image of scenery.

The above described adjustment may be made by a viewer selecting the change point of the scenes. Alternatively, the above described adjustment may be made by automatically determining the change point of the 2D image and the 3D image using the motion vector described in the embodiment 1. For example, a case where there is no correlation of the motion vector between a certain frame image and the succeeding frame image is determined to be the change point of the scenes.

Figure 10:
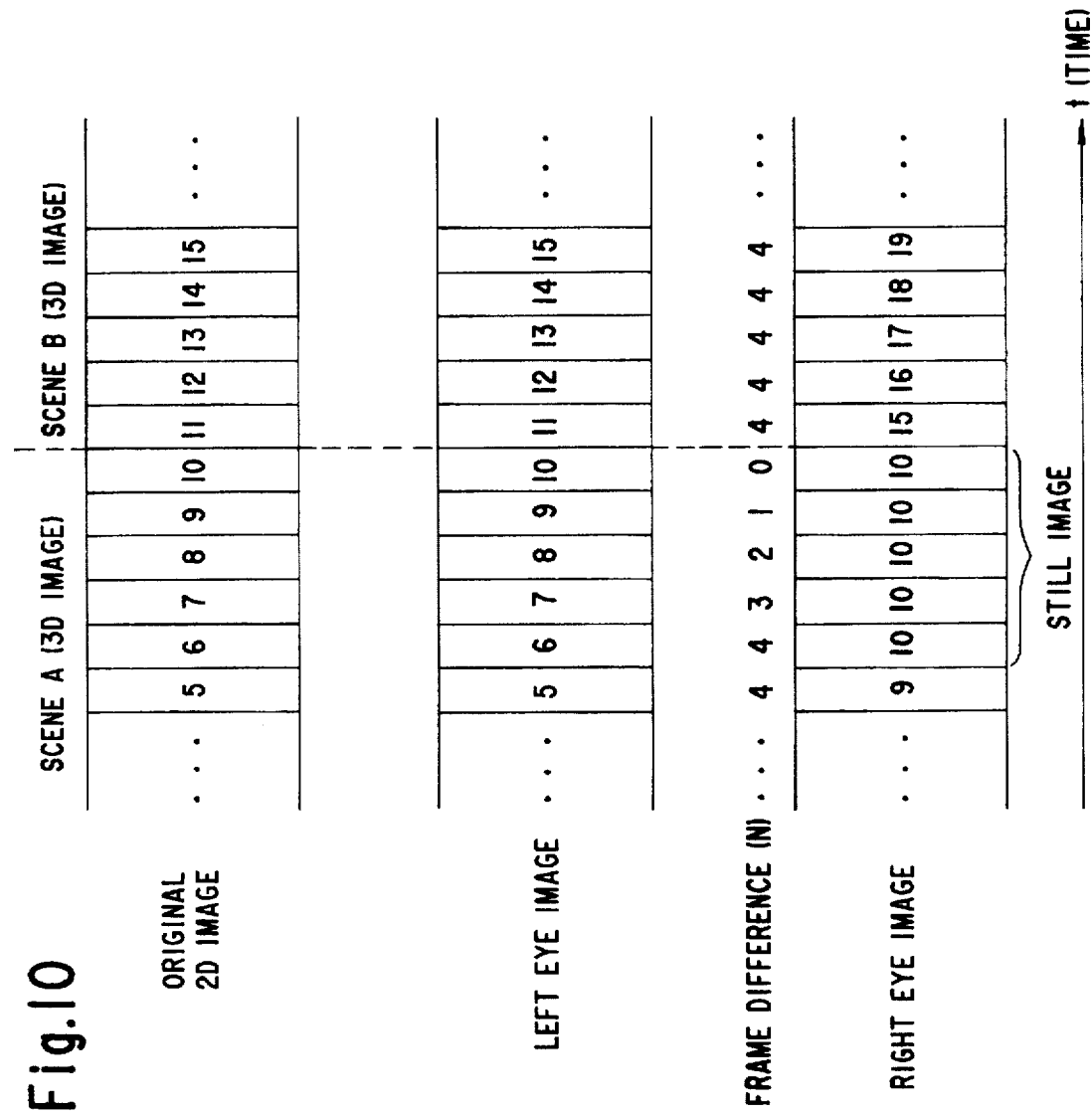
FIG. 10 is a conceptual diagram showing a frame-to-frame correspondence (a frame difference "4") before and after a change point of respective scenes on 3D images in a third embodiment of the present invention.
Figure 11:
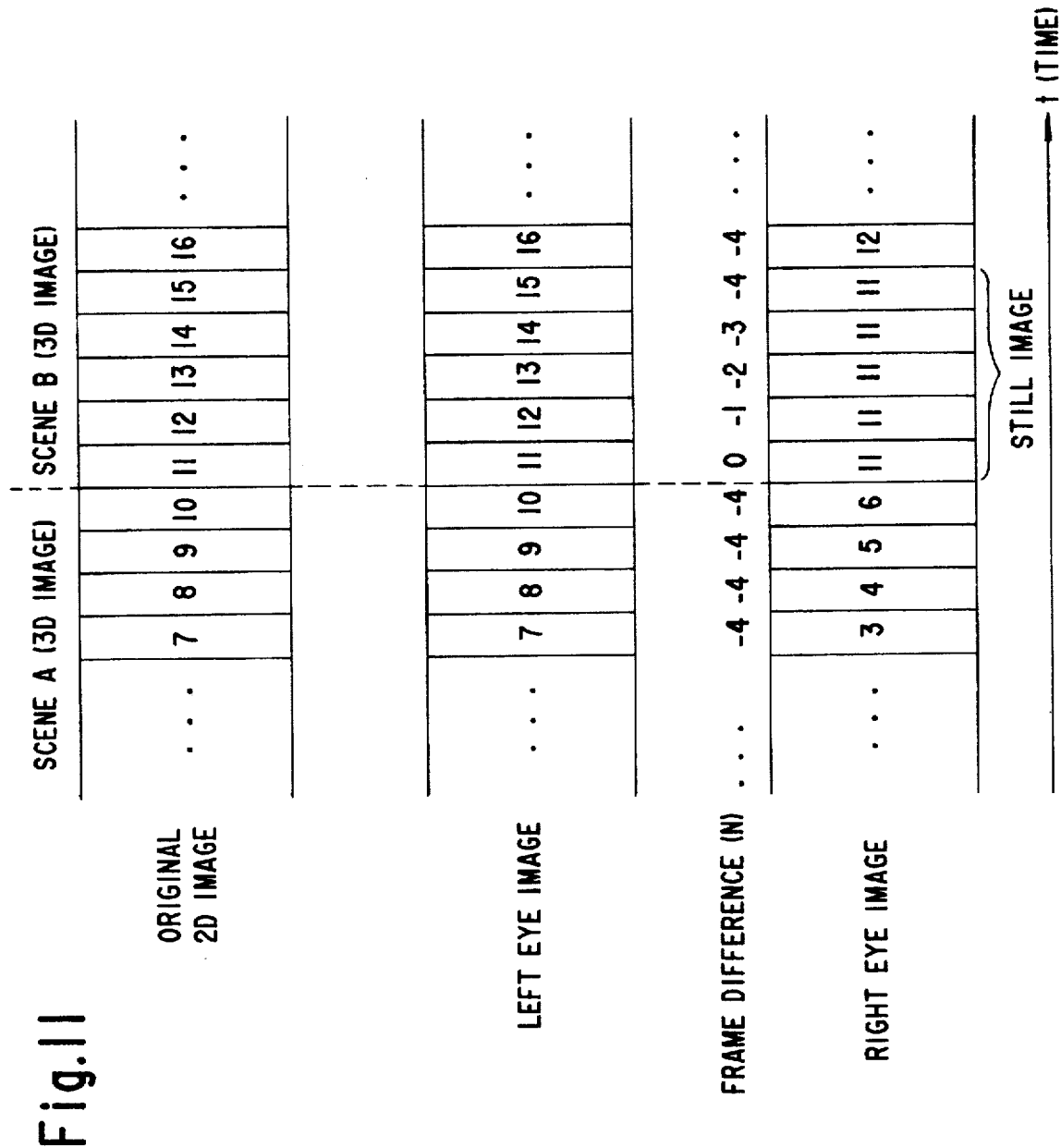
FIG. 11 is a conceptual diagram showing a frame-to-frame correspondence (a frame difference "–4") before and after a change point of respective scenes on 3D images in the third embodiment of the present invention.

FIG. 10 illustrates a case where a right eye image is four frames ahead of a left eye image, and FIG. 11 illustrates a case where a right eye image is four frames behind a left eye image.

In FIG. 10, in order to set back the background moving rightward in the horizontal direction from a screen, frame images ". . . 5, 6, 7, 8, 9, 10" are output in that order as a left eye image, while frame images which are four frames ahead of the frame images of the left eye image are output as a right eye image in a scene A. If the output is continued, however, there occurs a state where frame images on which the scene A is projected and frame images on which a scene B is projected are present as a mixture, whereby a frame 10 which is the last frame image out of the frame images before a change point of the scenes is repeatedly output as the right eye image until the change point.

After the scene A is switched to the scene B, frames 11, 12, 13, 14, 15, . . . are projected in that order as the left eye image and correspondingly, frames 15, 16, 17, 18, 19, . . . are output in that order as the right eye image while maintaining the frame difference (N) at "4".

In FIG. 11, in order to set back the background moving rightward in the horizontal direction from a screen, frame images "... 7, 8, 9, 10" are output in that order as a left eye image, while frame images which are four frames behind the frame images of the left eye image are output as a right eye image in a scene A.

If the output is continued, however, there occurs a state where frame images on which the scene A is projected and frame images on which a scene B is projected are present as a mixture, whereby a frame 11 which is the first frame image out of the frame images after a change point of the scenes is repeatedly output as the right eye image for a time period corresponding to five frames after the change point. Specifically, the frame difference (N) is so adjusted that both the images have frame images on which a common scene is projected, that is, it becomes −4, −4, −4, −4, 0, −1, −2, −3, −4, ... in that order.

If an image of a frame 16 is projected as the left eye image, an image of a frame 12 is projected as the right eye image, so that the frame difference (N) is maintained at "−4".

At the change point of the respective scenes on the 3D images, a still image which is the right eye image is projected before or after the change point of the scenes depending on the direction of the movement of an object to be jumped out.

(In the case of a change point of a 2D image and a 3D image)

Figure 12:
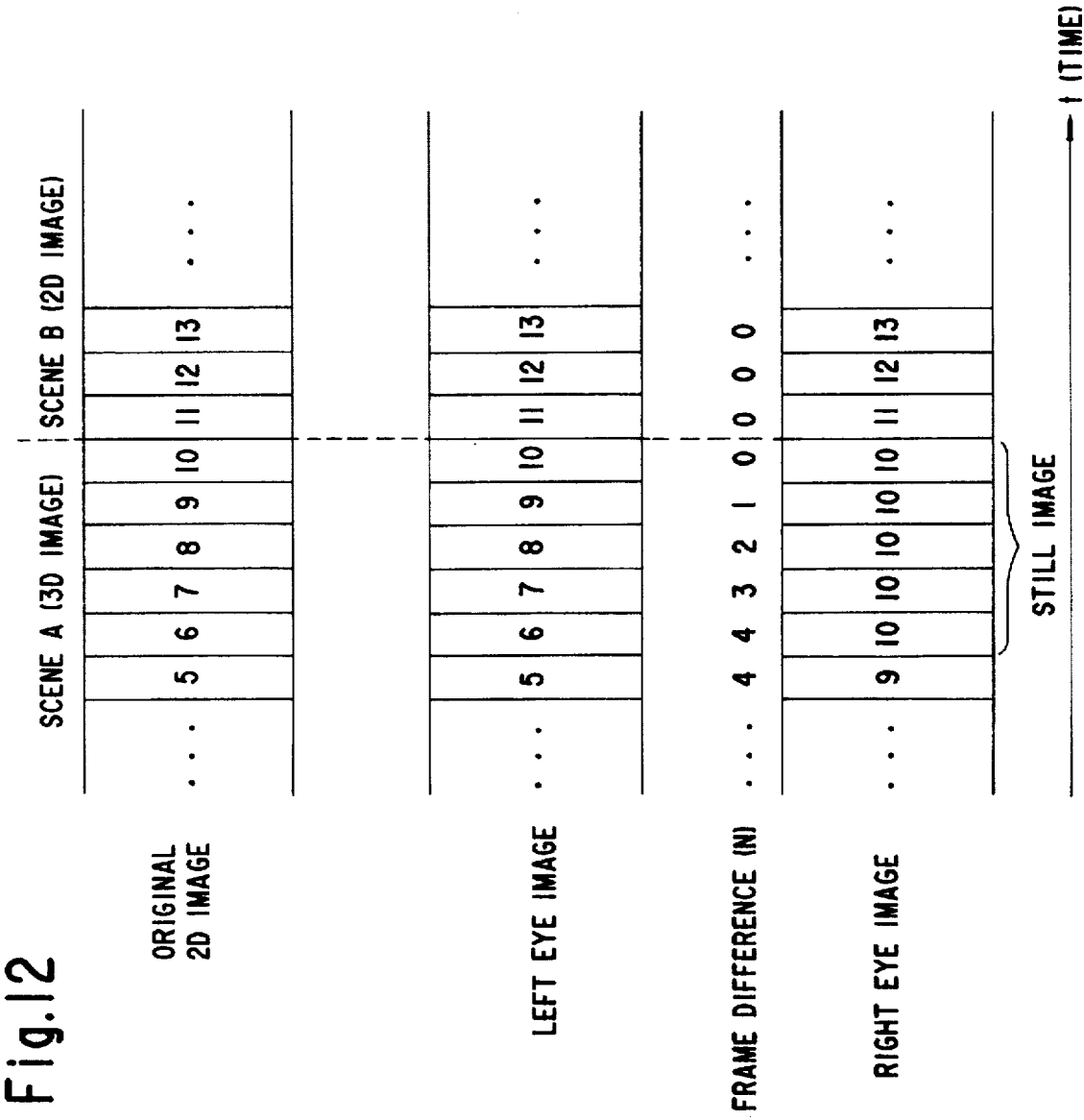
FIG. 12 is a conceptual diagram showing a frame-to-frame correspondence (a frame difference "4") before and after a change point of scenes from a 3D image to a 2D image in the third embodiment of the present invention.

FIG. 12 illustrates a correspondence between frames in the case of a change point of a scene A on a 3D image and a scene B on a 2D image. In the scene A shown in FIG. 12, a right eye image is four frames ahead of a left eye image.

In FIG. 12, in order to further set back the background moving in the horizontal direction from a screen, frame images "... 5, 6, 7, 8, 9, 10, ..." are output in that order as a left eye image at the same time in the scene A. On the other hand, when an image of the frame 5 is output as the left eye image, an image of a frame 9 which is four frames ahead of the image of the frame 5 is output as the right eye image.

If the output is continued, however, there occurs a state where frame images on which the scene A is projected and frame images on which the scene B is projected are present as a mixture, whereby a frame 10 which is the last frame image out of the frame images before a change point of the scenes is repeatedly output as the right eye image until the change point. Specifically, the frame difference (N) is so adjusted that both the images have frame images on which a common scene is projected, that is, it becomes 4, 4, 3, 2, 1, 0, ... in that order.

In the scene B, frames 11, 12, 13, ... are output in that order as the left eye image and correspondingly, frames 11, 12, 13, ... are output in that order as the right eye image while maintaining the frame difference (N) at "0", thereby to obtain a 2D image.

Figure 13:
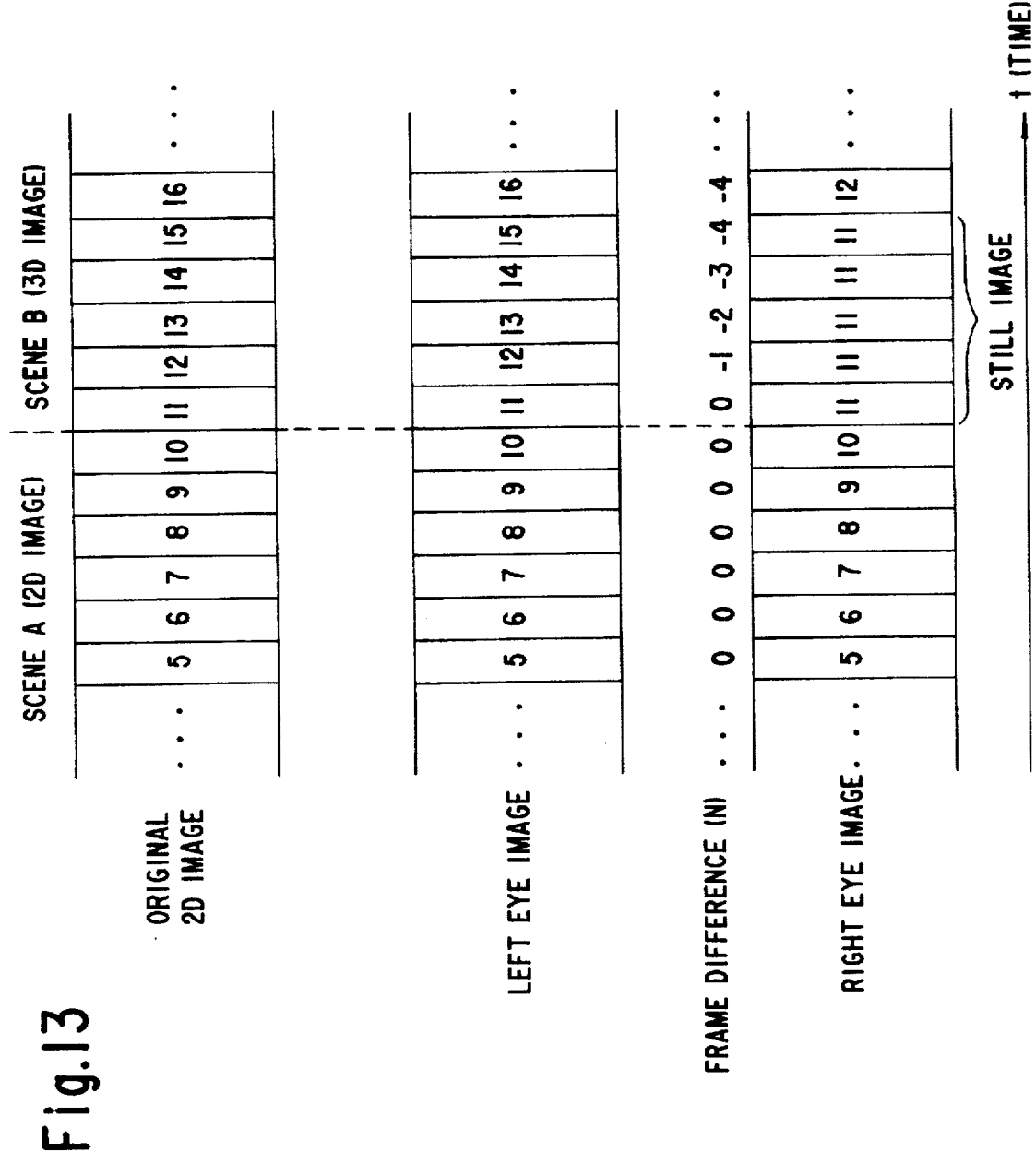
FIG. 13 is a conceptual diagram showing a frame-to-frame correspondence (a frame difference "–4") before and after a change point of scenes from a 2D image to a 3D image in the third embodiment of the present invention.

FIG. 13 then illustrates a correspondence between frames in the case of a change point of a scene A on a 2D image and a scene B on a 3D image. In the screen B shown in FIG. 13, a right eye image is four frames behind a left eye image.

In the scene A, frames ... 5, 6, 7, 8, 9, 10 are output in that order as the left eye image while maintaining the frame difference (N) at "0", to obtain a 2D image.

In order to further set back the background moving leftward in the horizontal direction from a screen, frames 11, 12, 13, 14, 15, 16, ... are output in that order as the left eye image, while a frame 11 is continuously and repeatedly output as the right eye image at the same time in the scene B (the 3D image). If frames 16, ... are projected as the left eye image, frames 12, ... are output as the right eye image, whereby the frame difference (N) is maintained at "−4" between both the images.

At the change point of the scenes between the 2D image and the 3D image, a still image which is the right eye image is output before or after the change point of the scenes depending on the direction of the movement of an object to be jumped out.

As described in the foregoing, the frame difference (N) is so changed that frames constituting one scene do not get mixed with frames constituting the other scene at a change point of scenes between a 2D image and a 3D image or between 3D images, whereby an unnatural 3D image or 2D image is not projected, thereby to produce such an effect that an image soft to the viewer's eyes is always projected from a screen.

Although in the present embodiment, frame images constituting the original 2D image are output in that order as an image for one eye, while one of the frame images constituting the original 2D image at a change point of scenes is repeatedly output for a predetermined time period as an image for the other eye so that both the images have frame images on which a common scene is projected at the change point, the modified example of the embodiment 2 may be carried out in the present embodiment.

Specifically, the frame difference (N) may be gradually changed by outputting frame images constituting the original 2D image in that order as an image for one eye, while repeatedly outputting each of two or more frame images out of the frame images constituting the original 2D image in the vicinity of a change point of scenes for a predetermined time period as an image for the other eye so that both the images have frame images on which a common scene is projected at the change point.

Figure 14:
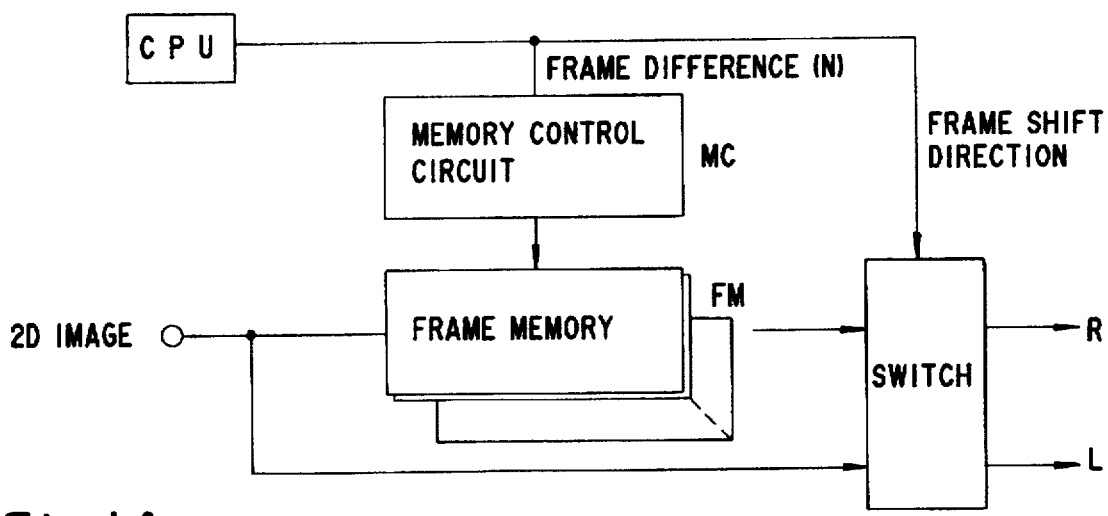
FIG. 14 is a block diagram showing a circuit for realizing a method according to the present invention.

FIG. 14 is a block diagram showing the hardware construction realizing the methods according to the above described embodiments. In FIG. 14, an original 2D image input directly enters a switch (SW), to be a left eye image signal or a right eye image signal.

Furthermore, the original 2D image is incorporated in a frame memory (FM), and image data in a frame which is subjected to predetermined frame delay (progress) by information on a frame difference (N) in a CPU (Central Processing Unit) is inputted to the switch (SW). Specifically, the CPU receives information related to a motion vector from a motion vector detecting portion (not shown), to determine the contents of a 2D image (which of a 3D image and a 2D image is suitable, for example) and a change point of scenes on the original 2D image. At a change point of the 3D image and the 2D image and the change point of the scenes, the information on the frame difference (N) is output to a memory control circuit (MC) from the necessity of repeatedly projecting data in the same frame. The memory control circuit (MC) repeatedly selects the same frame from the frame memory (FM) on the basis of the information on the frame difference (N).

The data input to the switch (SW) are switched by the switch (SW) and are output, to obtain desired left and right eye image signals. The switch (SW) is switched by receiving information on the frame shift direction from the CPU.

(Embodiment 4)

In the above described embodiments, a 3D image is produced by the delay (progress) of all frame images, thereby to make it difficult to produce parallax for each object on a screen. In the present embodiment, one or more objects are taken out of the frame images to shift the position of each of the objects.

For example, a 2D image which is constituted by a plurality of frame images which are continuous in time is taken as an image for one eye, while a 2D image in which the position of each of a plurality of objects which exist in the image for one eye is shifted on the basis of the moving speed and the direction of the object is taken as an image for the other eye.

Alternatively, a 2D image which is constituted by a plurality of frame images which are continuous in time is taken as an image for one eye, while a 2D image in which the position of each of a plurality of objects which exist in the image for one eye is shifted on the basis of information on the depth of the object is taken as an image for the other eye.

In such image software that each of objects in frames has 3D information (information on the depth), for example, an animation produced using a technique such as computer graphics (hereinafter referred to as CG), therefore, the object can be automatically extracted, to make it easy to process the object (shift the position thereof), which is the most suitable.

On the other hand, even in general analog video software, it is possible to extract objects in frames by using a technique such as contour extraction and shift the position of each of the extracted objects for the purpose of conversion into a 3D image.

Furthermore, it is also possible to only extract objects manually by an editor, and automatically perform the other operations.

One example of this method will be described on the basis of FIG. 15. First, the original 2D image software (a left eye image) is first reproduced in the step S11.

Objects are then automatically extracted (or manually extracted) in frames constituting the image software and are taken out of the frames in the step S12.

The amount of movement of each of the objects is calculated on the basis of information on the depth of the object in the frames, in the step S13.

Each of the objects is finally moved by the calculated amount of movement of the object in the step S14, to take frame images which are subjected to the movement processing as a right eye image and record the right eye image in synchronism with the original 2D image software for each frame in the step S15.

Figure 15:
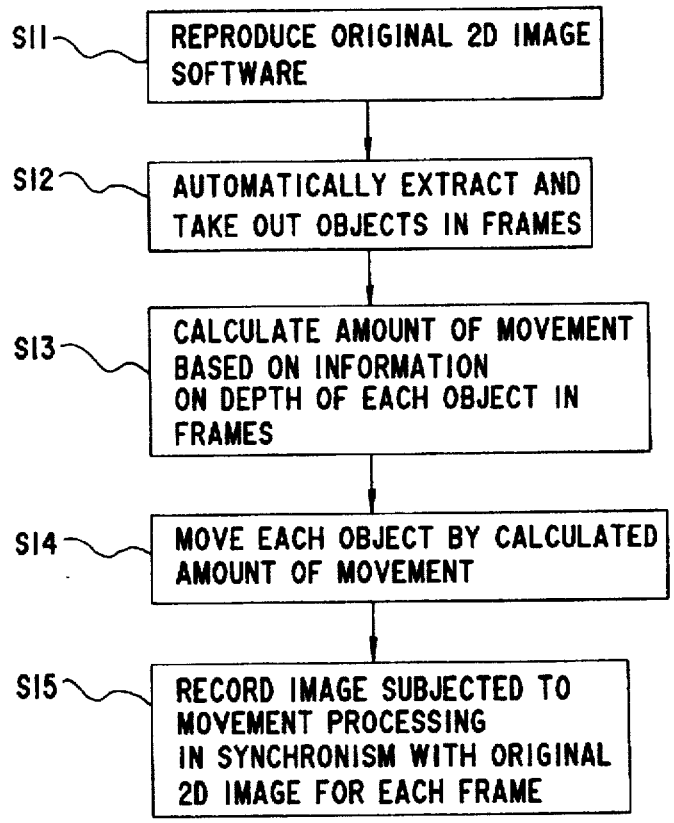
FIG. 15 is a flow chart showing the contents of image processing in a fourth embodiment of the present invention.
Figure 16A:
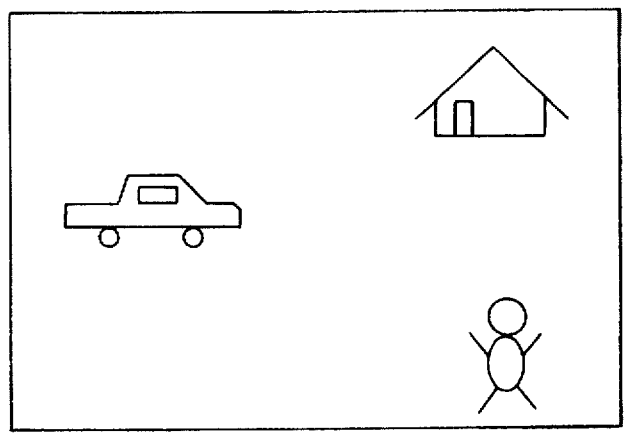
FIGS. 16A and 16B are conceptual diagrams for explaining the movement of each object in the fourth embodiment of the present invention.
Figure 16B:
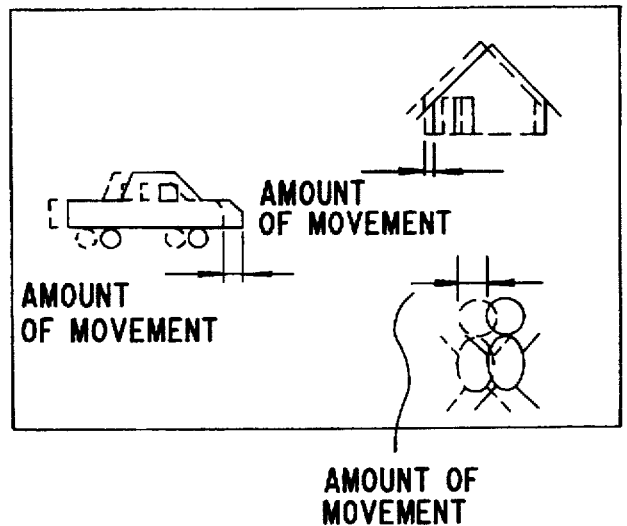

FIG. 16A is an illustration showing one example of an image (a left eye image) of the original 2D image software, and FIG. 16B is an illustration showing an example of an image produced by processing described in the flow chart of FIG. 15.

In FIG. 16B, the amount of movement differs depending on each object (a house, a car, a person), and information on parallax is changed with the amount of movement.

Consequently, a 3D image having the sense for the real is recognized by a viewer. A broken line in FIG. 16B indicates the position of the object before the movement.

If general analog video software is used, a region having no pixel information occurs in an image in which an object has been moved. This can be coped with by filling the region using interpolation based on pixel information in the vicinity of the region. On the other hand, when the background and a character are constituted by independent images in the case of the CG, such a problem does not occur.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of converting a two-dimensional image into a three-dimensional image, comprising the steps of:

taking a two-dimensional image which is constitute by a plurality of frame images which are continuous in time as an image for one eye, while taking a two-dimensional image obtained by shifting said image for one eye by N frames, where N includes the number zero and is not a fixed number, as an image for the other eye, therein to produce a three-dimensional image, wherein said N which is a frame difference is adjusted for each switching of scenes on the two-dimensional image.

2. A method of converting a two-dimensional image into a three-dimensional image, comprising the steps of:

taking a two-dimensional image which is constitute by a plurality of frame images which are continuous in time as an image for one eye, while taking a two-dimensional image obtained by shifting said image by N frames, (where N includes the number zero and is not a fixed number) as an image for the other eye, and gradually changing said N which is a frame difference at a change point of the two-dimensional image and a three-dimensional image, wherein said N which is a frame difference is gradually changed by outputting consecutive frame images constituting the two-dimensional image as an image for one eye, while repeatedly outputting one of the frame images constituting the two-dimensional image at said change point for a predetermined time period as an image for the other eye.

3. A method of converting a two-dimensional image into a three-dimensional image, comprising the steps of:

taking a two-dimensional image which is constitute by a plurality of frame images which are continuous in time as an image for one eye, while taking a two-dimensional image obtained by shifting said image by N frames, where N includes the number zero and is not a fixed number, as an image for the other eye, and gradually changing said N which is a frame difference at a change point of the two-dimensional image and a three-dimensional image, wherein said N which is a frame difference is gradually changed by outputting consecutive frame images constituting the two-dimensional image as an image for one eye, while repeatedly outputting each of two or more frame images constituting the two-dimensional image in a vicinity of said change point for a predetermined time period as an image for the other eye.

4. A method for converting a two-dimensional image into a three-dimensional image, comprising the steps of:

taking a two-dimensional image which is constituted by a plurality of frame images which are continuous in time as an image for one eye, while taking a two-dimensional image obtained by shifting said image by N frames, where N includes the number zero and is not a fixed number, as an image for the other eye, and gradually changing said N which is a frame difference so that the image for one eye and the image for the other eye have frame images on which a common scene is projected at a changed point of scenes on the two-dimensional image.

5. The method according to claim 4, wherein said N which is a frame difference is gradually changed by a viewer the two-dimensional image to determine the change point of the scenes.

6. The method according to claim 4, wherein said N which is a frame difference is gradually changed by automatically determining the change point of the scenes based upon presence or absence of a correlation with time of information on a motion vector obtained from the two-dimensional image.

7. The method according to claim 4, wherein said N which is a frame difference is gradually changed by outputting consecutive frame images constituting the two-dimensional image as an image for one eye, while repeatedly outputting one of the frame images constituting the two-dimensional image at said change point for a predetermined time period as an image for the other eye.

8. The method according to claim 4, wherein said N which is a frame difference is gradually changed by outputting consecutive frame images constituting the two-dimensional image as an image for one eye, while repeatedly outputting each of two or more frame images out of a frame images constituting the two-dimensional image in a vicinity of said change point for a predetermined time period as an image for the other eye.

* * * * *